United States Patent [19]
Vargo

[11] Patent Number: 5,180,068
[45] Date of Patent: Jan. 19, 1993

[54] CONNECTION FOR A STRUCTURAL RACK SYSTEM

[75] Inventor: William R. Vargo, Lithonia, Ga.

[73] Assignee: Hardy Manufacturing, Inc., Lithonia, Ga.

[21] Appl. No.: 797,181

[22] Filed: Nov. 25, 1991

[51] Int. Cl.$^5$ .............................................. A47F 5/00
[52] U.S. Cl. .................................. 211/191; 211/192; 403/231
[58] Field of Search ............... 211/189, 186, 187, 191, 211/190, 182; 403/388, 231, 408.1

[56] References Cited

U.S. PATENT DOCUMENTS

| | | | |
|---|---|---|---|
| 4,106,630 | 8/1978 | Rosenband | 211/191 |
| 4,448,315 | 5/1984 | Obermeyer | 211/191 |
| 4,496,061 | 1/1985 | Highsmith | 211/191 |
| 4,678,091 | 7/1987 | Konstant | 211/191 |
| 5,020,678 | 6/1991 | Klein | 211/191 |

FOREIGN PATENT DOCUMENTS 402883  5/1970  Australia .............. 211/191

OTHER PUBLICATIONS

Brochure entitled "Konstant Products".

Brochure entitled "Unarco Material Handling Structural Rack".

*Primary Examiner*—Robert W. Gibson, Jr.
*Attorney, Agent, or Firm*—Body, Vickers & Daniels

[57] ABSTRACT

An improved connection for a rack system joining together first and second elongated structural members in transverse relationship. The first member has a plurality of longitudinally spaced aligning holes, each of which include an inside bearing surface, while the second member consists of at least one fastening hole and one load bearing wedge action seating lug. The seating lug is spaced from the fastening hole a distance equal to the longitudinal spacing between aligning holes in the first member. The seating lug is adapted to extend within one of the aligning holes in the first member to position another aligning hole in registry with the fastening hole in the second member. A bolt or other fastener means is then protruded through the fastening hole and the other aligning hole. A cam means on the seating lug engages the inside bearing surface of one of the aligning holes moving the first and second members into side-by-side contact when the fastener is tightened. The unique combination of seating lug and bolt provides a strong, rigid connection reducing lateral and transverse movement in the rack system and providing for safe and easy assembly and disassembly.

33 Claims, 3 Drawing Sheets

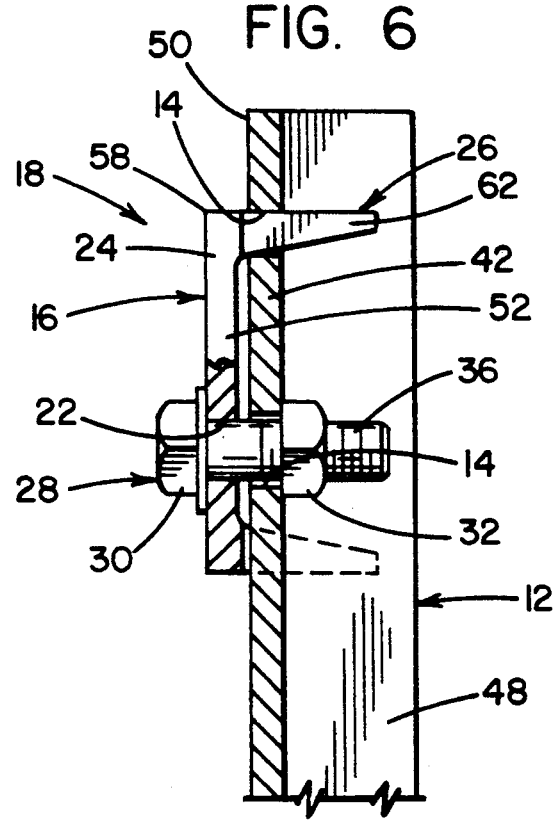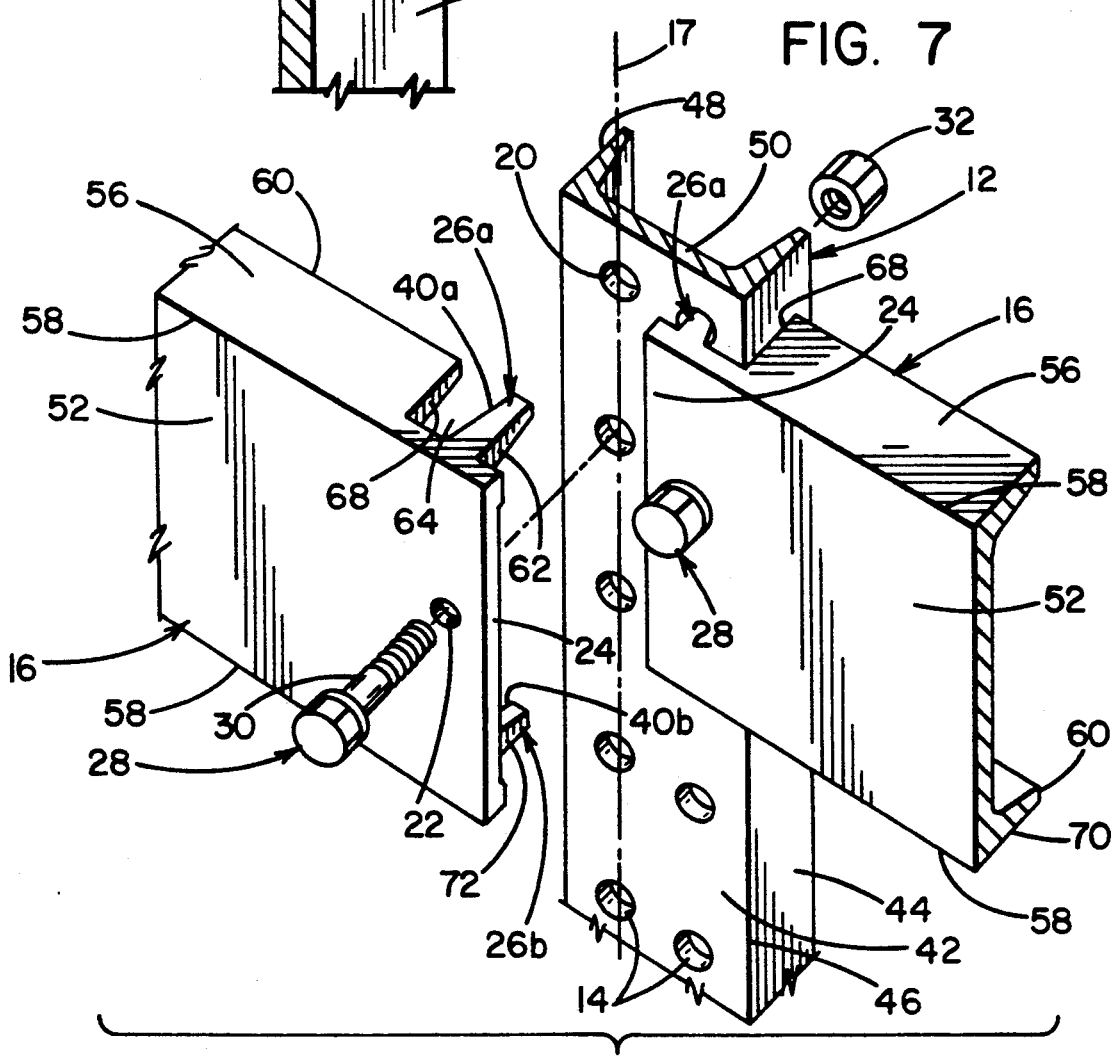

CONNECTION FOR A STRUCTURAL RACK SYSTEM

The present invention relates to a structural rack system used in storage warehouses and the like, and more particularly to a connection for use in the rack system.

The invention is particularly applicable to and will be described with specific reference to a rack for use in a storage, warehouse system. However, it will be appreciated that the invention is applicable to any kind of structural support such as supports for piping or electrical conduit and can be utilized in the construction of buildings employing steel supports.

INCORPORATION BY REFERENCE

Konstant et al U.S. Pat. No. 4,678,091 and Klein U.S. Pat. No. 5,020,678 are incorporated by reference herein so that background rack systems known in the art need not be described in detail herein.

BACKGROUND OF THE INVENTION

A rack system is a term commonly used in the art to define a system or method for assembling structural members into a skeleton shape (i.e. similar to an erector set) which supports goods typically set on pallets in a warehouse. As used herein, "rack" systems include not only such systems but any structural assembly for supporting loads such as piping or electrical conduit or even when used for building structures.

Rack systems are assembled with column to beam connections. These connections typically include fasteners such as bolt and nut connections or welded connections or a combination thereof. The connections are critical to the structural integrity of the systems both for rigidity, shock loading, vibrations and sidesway. If the connection is not structurally sound, uneven loading on the rack can induce sidesway which in turn induces loads in the individual structural members for which they were not designed, causing deformation, bending, collapse, etc. Vibration loads must be an important consideration in racks, especially when used for supporting piping systems or when positioned near heavy machinery. Shock or impact loading, such as when pallets are dropped on the rack or the rack is rammed by forklift trucks must also be considered.

Another problem with conventional rack systems is in the safety of assembly and disassembly. Workmen must sometimes work at elevations of 20 feet or more. Current assemblies require workmen constantly working with both hands, which does not allow safe movement without the possibility of a fall.

The prior art has recognized the importance of a secure connection to the integrity of a rack system. Welding, in combination with gusset plates, lateral bracing, or cross bracing either at the connection or between load bearing members helps reduce sidesway. However, welded connections are generally only 20% as strong as bolted connections. Additionally, proper welds require skilled craftsmen, are labor and cost intensive, and unsuited for non-destructive disassembly.

In an attempt to solve some of these problems, Konstant et al U.S. Pat. No. 4,678,091 discloses a beam to column connection where a bolt is inserted at an acute angle through overlapping holes aligned in offset relation and the members are drawn together upon tightening of the fastener. As the nut is tightened, the offset holes are brought closer into alignment and the members laterally move into abutting contact with one another. It is difficult, in Konstant, to insert the bolt into the offset holes, especially for long and/or heavy members. In addition, Konstant produces a weak bolt connection in that a bending moment shear stress is induced in the bolt because the bolt holes must be large enough to accommodate a bolt at an acute angle. Perhaps, more significantly, as the connection is tightened in Konstant, the bolt approaches perpendicular alignment. However, the connected structural members will not be drawn into surface to surface contact with one another at the bolted connection. Thus, sidesway can still be induced.

An attempt to improve Konstant's system is disclosed in Klein U.S. Pat. No. 5,020,678 which uses a one bolt connection with a nut having a cam surface adapted to engage the inside surface of the flange of a structural member such as a channel or an angle. As the bolt is tightened, the members are wedged together into abutment as the nut is axially drawn along the threaded stud in contact with the flange which is increasing in thickness. Assembly in Klein is difficult because the cam nut must be accurately positioned before tightening. In addition, Klein, as is the case in Konstant, must have larger bolt hole diameters than what is normally established for bolted connections which induce excessive shear stresses on the bolt. Perhaps, more importantly, Klein, as in Konstant, cannot draw the two members tightly together at the bolted connection since they have been transversely shifted into abutment (or if the members are drawn tightly together at the bolted connection then they have not laterally shifted into abutting contact). Thus, Klein also does not address the sidesway problem.

SUMMARY OF THE INVENTION

Accordingly, it is a principal object of the invention to provide a fastener connection which overcomes the disadvantage of prior art fastener connections in that a rigid connection which is easily and safely assembled for a rack system is provided.

This object, along with other features of the invention is achieved in a connection joining together first and second elongated structural members. The first member has aligning holes therein which are longitudinally spaced along the entire length of the first member. The second member has at least one fastening hole therethrough which is adjacent the axial ends of the second member and a camming, load bearing, wedge action, seating lug member which is longitudinally spaced from the fastening hole at a distance equal to the longitudinal spacing between the aligning holes in the first member. The seating lug member is adapted to extend into one of the aligning holes of the first member to position another aligning hole in the first member in registry with the fastening hole in the second member. A fastener mechanism protruding though the fastening hole and the other aligning hole is provided for drawing the first and second members together. A cam mechanism on the seating lug member engages the inside bearing surface of the one aligning hole which the seating lug member extends into for moving one of the members into side by side contact with the other one of the members when the fastening mechanism draws the first and second members together. In this manner the members are not only wedged together to produce a rigid connection, but the connection inherently minimizes sidesway tendencies being a two-prong spaced connection.

In accordance with another aspect of the invention, a rack apparatus, or alternatively a system for removably assembling structural members to one another is provided which apparatus or system includes a plurality of first elongated structural members with each first member having a plurality of longitudinally spaced aligning holes extending therethrough with each aligning hole having an inside bearing surface. A plurality of second elongated structural members is provided removably connected to the first elongated structural members with each second member having at least one seating lug protruding from at least one axial end thereof and at least one fastening hole longitudinally spaced from the seating lug at the axial end. The seating lug of one of the second members is adapted to be inserted into one of the aligning holes in one of the first members so that the fastening hole in the second member is brought into registry with another one of the aligning holes in the first member. A removable fastener mechanism is provided which protrudes through the fastening hole and the other aligning hole for drawing the members together and a cam mechanism on the seating lug moves one of the first or second members into side by side contact with the other member when the fastening mechanism draws the first and second members together whereby a rigid assembly is assured in a two pronged connection which minimizes sidesway.

In accordance with a more specific feature of the invention, the first member includes a longitudinally extending web portion having a plurality of aligning holes therethrough at spaced increments along its length and a longitudinally extending first flange portion which extends or depends from a transverse edge of the web portion and extends between the axial ends of the first member whereby the camming mechanism is effective to bring the second member into contact with the first flange portion of the first member so that a rigid connection extending the depth of the flange member is provided.

In accordance with a particularly important feature of the invention, the second member includes a web portion longitudinally extending between its axial ends with a fastening hole extending therethrough adjacent each of its axial ends. The second member has a longitudinally extending first flange portion depending or extending from a transverse edge of the web portion and terminating at a bottom edge. The first flange portion has longitudinally spaced edge end surfaces with each longitudinal end surface spaced a longitudinal distance away from the axial ends of the second member. The flange portion further has a notched opening extending from its bottom edge to the web portion to define longitudinally spaced first and second flange edge surfaces extending from the bottom edge to the web portion so that the seating lug member includes that segment of the flange portion longitudinally extending from the longitudinal edge end surface to the first edge surface whereby a conventional structural shape such as an angle or a channel or alternatively an I-beam, may be utilized to form the seating lug member by simply notching the structural members.

In accordance with another important aspect of the invention, a structural channel member may be similarly notched at both flanges to provide two protruding seating lugs or alternatively two fastening holes in combination with one camming seating lug may be provided to provide rigid connections ideally suited for relatively large or heavy structural members.

In accordance with still yet another feature of the invention, a method is provided for assembling first and second elongated structural members together in a rack system with each of the first members having a plurality of longitudinally spaced aligning holes therethrough. The method includes the steps of: providing each of the second members with a protruding seating lug adjacent each axial end thereof and at least one fastening hole extending therethrough with the fastening hole longitudinally spaced from the seating lug a distance equal to the longitudinal spacing of the aligning hole in the first member; orientating a plurality of the first elongated structural members in one direction at spaced intervals therebetween; inserting one of the seating lugs of one of the second members into one of the aligning holes in one of the first members and then inserting the seating lug at the opposite axial end of the one second member into an aligning hole of another one of the first members so that the second member transversely extends between the one first member and the other first member with the result that the studs support the weight of the second member while aligning the fastening hole at each end of the second member with an aligning hole in the one first member and an aligning hole in the other first member whereby fasteners joining the first and the second members together can be easily inserted in a method which is inherently safer than prior art procedures.

In accordance with still another aspect of the method, the seating lugs have a tapering cam surface which cams the members into side by side contact as the fasteners are tightened.

It is thus an object of the invention to provide a rack apparatus or system or method for assembling structural members which permit easy and safe assembly.

It is yet another object of the invention to provide a rack type connection which permits easy assembly and disassembly of a rack system.

Still yet another object of the invention is to provide a rack connection which rigidly wedges members into abutting contact with one another as the connection is tightened.

Yet another object of the invention is to provide a rack connection which minimizes sidesway.

Still yet another object of the invention is to provide a rack connection which is able to withstand vibrations and/or shock impacts imparted to the rack.

Still yet another object of the invention is to provide a rack connection which avoids undue stresses placed on the threaded fastener thus making a stronger connection.

Still yet another object of the invention is to provide a rack connection system or an apparatus which utilizes conventional structural shapes or elements which can be easily modified to function as a rack connection.

Still yet another object of the invention is to provide a weld free rack system.

Still yet another object of the invention is to provide an inexpensive rack system utilizing conventional structural shapes.

These and other objects of the invention will become apparent to those skilled in the art upon reading and understanding the detailed description in the following section.

BRIEF DESCRIPTION OF THE DRAWING

The invention may take physical form in certain parts and arrangement of parts, a preferred embodiment of which will be described in detail and illustrated in the accompanying drawings which form a part hereof and wherein:

FIG. 6 is a side elevation view taken along line 6—6 of FIG. 5 showing the completed connection after first and second member have been drawn into contact; and FIG. 7 illustrates the connection using two seating lugs for greater strength and rigidity.

THE PREFERRED EMBODIMENT

Figure 1:
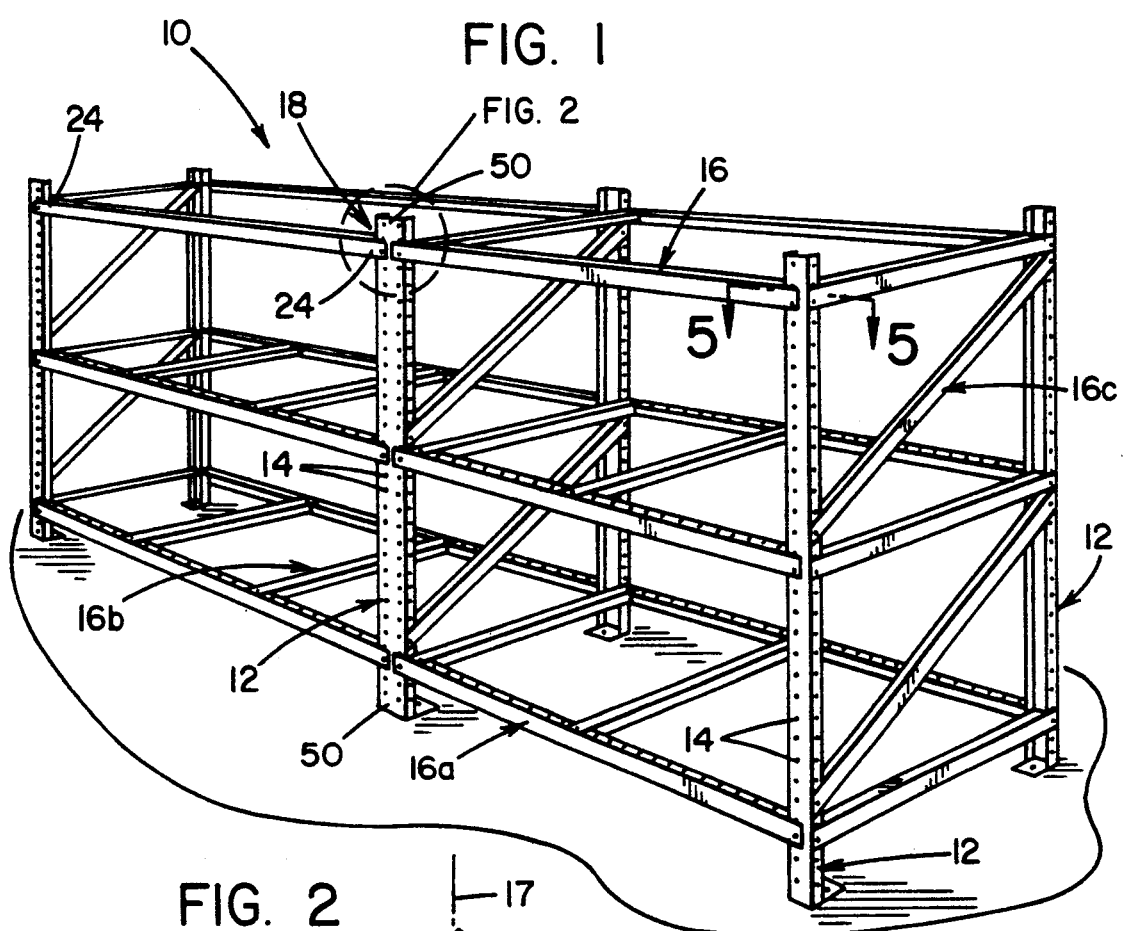
FIG. 1 is a pictorial view illustrating a structural rack system using the connection of the present invention.

Referring to the drawings wherein the showings are for the purpose of illustrating a preferred embodiment of the invention only and not for the purpose limiting same, FIG. 1 shows a structural rack system 10 used as structural support for a storage warehouse system. However, as discussed previously, rack 10 can be used as support for piping, electrical conduit or building structures which may require a design configuration altered from FIG. 1. Rack system 10 generally comprises a plurality of first elongated structural members 12 in the shape of a structural channel having a plurality of longitudinally spaced aligning holes 14 extending through first member 12. A plurality of second elongated structural members 16 generally in the shape of structural angles are connected to first members 12 at a connection point 18. All structural members 12 and 16 may alternatively be in any structural shape, such as angles, channels, or I-shapes. Additionally, rack system 10 can combine the use of differing shapes as required by design considerations. Second elongated member 16 can serve as horizontal members 16a or lateral braces 16b. Second members 16 in this function serve as supporting members for the structural load and increase load carrying capacity of the system. Second members can also serve as cross braces 16c to increase load capacities and preserve the rigidity of the system. As shown, second members 16a can also function as first members 12 when provided with a plurality of longitudinally spaced aligning holes 14. This invention applies to all such cross braces 16c and lateral braces 16b.

Figure 2:
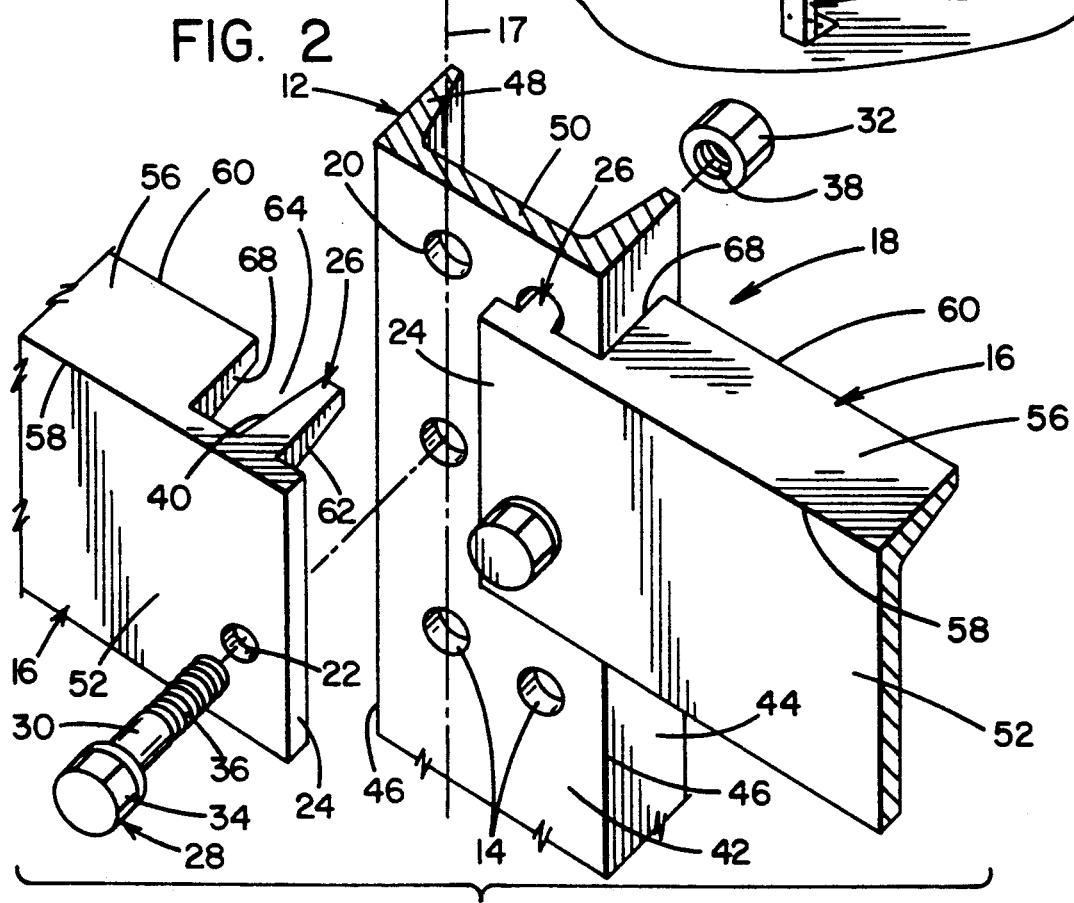
FIG. 2 is an enlarged view of the connection shown in FIG. 1 showing the preferred embodiment using one seating lug in combination with one fastening hole.

Referring to FIG. 2 there is shown a preferred embodiment of a connection 18. First elongated structural member 12 is joined together with second elongated structural members 16. First member 12 has a plurality of longitudinally spaced aligning holes 14, each hole 14 having an inside bearing surface 20. Second member 16 has a fastening hole 22 extending through member 16 at its axial end 24. Second member 16 also has a load bearing, wedge action seating lug 26 (hereinafter "seating lug") longitudinally spaced from fastening hole 22 a distance equal to the longitudinal spacing between aligning holes 14 in first member 12. Seating lug 26 is adapted to extend into aligning hole 14 in first member 12 which positions another aligning hole 14 in first member 12 in registry or general overlying alignment with fastening hole 22 in second member 16.

A fastener means 28, such as a bolt 30 and a nut 32 which protrudes through fastening hole 22 and aligning hole 14 draws first member 12 and second member 16 together. Fastener 28 could be any other type of connector, conceivably even a rivet, so long as it is effective to draw first and second members 12 and 16 together. Bolt 30 has a bolt head 34 and a threaded shank 36 extending along the longitudinal axis of bolt 30. Nut 32 has a threaded hole 38 which will engage threaded shank 36 of bolt 30. Bolt 30 and nut 32 are conventional. Only design considerations for individual rack systems 10 limit the type of bolt 30 and nut 32 to be used. Bolt 30 and nut 32 may be of differing grades of steel or strength, may be plated, or may be made of materials other than steel. Other possible variants include bolt head 34 and nut 32 hexagonal shaped, notched, as for a screwdriver, or square. Preferably, bolt 30 and nut 32 connections use lock washers or lock nuts or nut 32 is a lock nut.

Second member 12 includes a cam surface 40 on seating lug 26 for engaging inside bearing surface 20 of aligning hole 14. Cam surface 40 allows first member 12 and second member 16 to move into side-by-side contact when fastener 28 draws first and second members 12 and 16 together.

First member 12 includes a longitudinally extending web portion 42 which has a plurality of aligning holes 14 extending therethrough at spaced increments along the length of web 42. First member 12 also includes a first flange portion 44 depending or extending from a transverse edge 46 of web portion 42 and a second flange portion 48 depending or extending from a transverse edge 46 of web 42 opposite first flange portion 44. Each flange portion 44, 48 extends between the axial ends 50 of first member 12, thereby forming a structural channel configuration. Cam surface 40 brings second member 16 into contact with first flange portion 44 of first member 12. It is of course to be appreciated that first member 12 is shown as a channel for illustration purposes only. Other structural shapes could be employed. For example, a fabricated member in the shape of an angle or I-shape can be employed.

Second member 16 includes a web portion 52 longitudinally extending between each of its axial ends 24 with fastening hole 22 extending through web 52 adjacent to axial ends 24. Second member 16 has a longitudinally extending first flange portion 56 depending from a transverse edge 58 of web portion 52 and terminating at a bottom edge 60. First flange 56 has longitudinally spaced edge end surfaces 62 which are shown in the preferred embodiment spaced a longitudinal distance away from axial ends 24 of second member 16.

So long as aligning holes 14 in first member 12 are centered on a common longitudinally extending centerline 17, edge end surfaces 62 must be spaced some distance from axial end 24. The actual distance is a function of bolt diameter which determines hole diameter so that a sufficient amount of metal between axial end 24 and the hole margin or inside bearing surface 20 exists to prevent tear-out. As a matter of common practice, the distance at which edge end surface 62 is spaced from second member's axial end 24 is set at the diameter of fastening hole 22. Furthermore, it should be apparent to those skilled in the art that if aligning holes 14 were not centered on a common longitudinal centerline, but were alternatively staggered with respect thereto, then edge end surface 62 could be coincident with axial end 24 so long as a notched opening, discussed hereinafter, is provided.

Flange portion 56 has a notched opening 64 extending from bottom edge 60 to web portion 52 which is defined by a first flange edge surface which in the preferred embodiment is cam surface 40 longitudinally spaced from a second flange edge surface 68, both surfaces 40 and 68 extending from bottom edge 60 to web portion 52 of second member 16. Thus, cam surface 40 and edge surface 62 define the width of seating lug 26. In the preferred embodiment and in the alternative embodiments cam surface 40 is tapered. It should be clear to those skilled in the art that cam surface 40 could be straight in the sense of being perpendicular to web portion 52 and edge surface 62 could be tapered. Alternatively, both cam surface 40 and edge end surface 62 could be tapered. What is important is that the longitudinally extending distance of seating lug 26 at bottom edge 60 of flange portion 56 is less than the longitudinally extending distance of seating lug 26 at web portion 52. Furthermore, while cam surface 40 is shown tapering as a straight line, it should also be clear that the taper could be curvilinear or composed of different angled surfaces but in all cases, tapering so that seating lug 26 increases in the longitudinal direction as it approaches web portion 52. In addition, the depth of cam surface 40 (the distance that cam surface 40 transversely extends parallel to web portion 52) can be chamfered or radiused or rounded, but this is not necessary.

Second edge surface 68 is cut perpendicular to flange portion 56 and parallel to web portion 52 so that the depth of second edge surface 68 contacts flange portion 44 or 48 of first member 12 when lug 26 cams against bearing edge 20 as first and second members 12, 16 are drawn together by bolt 30 and nut 32. This is the preferred configuration for second edge surface 68 when first and second members 12, 16 are orthogonal to one another. This is also the preferred configuration when second member 16 is a channel structural shape or when two or more fastening holes 22 are used. However, the invention contemplates its use for cross braces 16c which are preferably at a 45° angle or any other angle to either first and second members 12, 16. Cross braces 16c are contemplated to be formed as angles so that only one flange portion 56 depends from web portion 52. For a 45° brace angle, second edge surface 68 could be cut at a 45° angle. Preferably though, the depth of second edge surface 68 would be simply chamfered from its inside and outside to form a line type contact extending from bottom edge 60 to web portion 52 and this construction would allow first and second members 12, 16 to be connected to one another at any angle.

Notch 64 and seating lug 26 may be formed when the steel member 16 is fabricated in the shop or can be cut into member 16 at a later time. This is an important aspect of the invention. No special, custom made parts are required for the invention. Conventional structural shapes are simply cut and drilled to provide structural members 12, 16. It is possible to practice the invention with a more expensive construction. For example, two or more fastening holes 22 can be provided and tapered studs press fitted or screwed into one of the fastening holes 22. Then edge end surfaces 62 are provided so that notched opening 64 is eliminated.

It should be clear, although not presently shown in the drawings, that because cam surface 40 forces second edge surface 68 of second member 16 into contact with flange portion 44 of first member 12, web portion 52 of second member 16 will not be brought into face-to-face contact with web portion 42 of first member 12. There will necessarily be a slight space if for nothing more than tolerances. However, there is always at least a two prong contact. One prong is bolt 30 tightened by nut 32. The other prong is seating lug 26 contacting inside bearing surface 20 and second flange edge surface 68 contacting flange portion 44. This two prong contact is transversely spaced and this inherently prevents sidesway which prior art, one piece, connections, cannot do. Furthermore, when alternative embodiments using two bolts or two lugs, or channels etc. are used, the two prong feature extends to a multi-prong concept which increases ability of the connection to prevent sidesway.

Each of the above elements of connection 18 uniquely combine to contribute to the overall rigidity of connection 18. The effect is to minimize sidesway in lateral and transverse directions, especially when induced by vibration, impact, or shock loading. The rigid abutment between flange portion 44 or 48 and second edge surface 68 reduces sidesway laterally while the two prongs of seating lug 26 and fastener 28 reduce possibility of transverse sidesway.

The strength of connection 18 is greatly increased by the rigidity. The moment capacity is increased by camming members 12 and 16 into abutment. Moment capacity and load carrying capacity of rack system 10 is additionally increased by providing the two prong connection of seating lug 26 and fastener 28 to connection 18. Unlike the prior art, connection 18 allows that the diameter of aligning holes 14 and fastening holes 22 to be of standard hole size diameter in relation to the outside diameter of fastener 28. Holes 14, 22 need only be of sufficient tolerances to allow fastener 28 to pass through both holes 14, 22 simultaneously. Connection 18 is stronger because the wedging action of seating lug 26 in combination with fastener 28, creates a friction connection. Ideally, only tensile forces are exerted in fastener 28 and shear forces are negligible. In other words, there is little bending moment shear stresses induced in bolt 30. This means that failure can only occur on tear-out. Thus, the connection is strong than prior art fastener connections. As is well known in the rack art, bolted connections are stronger than welded connections. Published data for ¾" bolt connections in a rack subjected to beam or moment arm loading show that ultimate vertical shear for a 3" beam welded to an angle connector is 9.7 KIPS which is less than the ultimate shear value of a single bolt of 23.6 KIPS for the Klein connector discussed above. The present invention because of lack of bending stress is stronger.

It should be noted that web 42 and flange 44, 48 of first member 12 and web 52 and flange 56 of second member 16 are relative terms that do not necessarily correspond to the labelling of shapes as defined in code manuals used by those skilled in the art. Therefore, where as shown in FIG. 1, second member 16a also serves as a first member 12, longitudinally spaced aligning holes 14 are placed in web 42 of member 12, but can also be described as being placed in flange 56 of second member 16a. These distinctions are important when rack system 10 consists of lateral braces 16b and cross-braces 16c.

Figure 3:
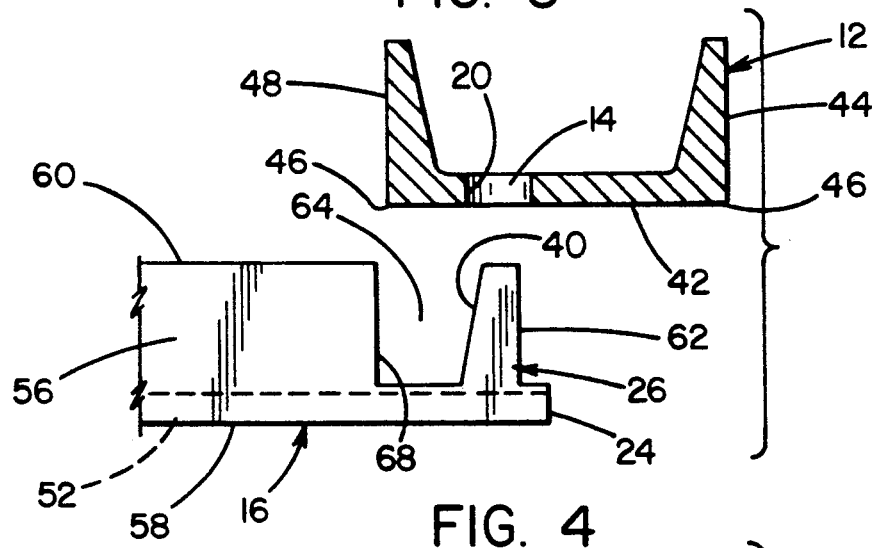
FIG. 3 is a plan view taken in cross-section of a connection showing the initial step of inserting a seating lug of a second member into an aligning hole of a first member.

Referring now to FIGS. 3–6 there is shown the connection and method for assembling the rack in accordance with the present invention, the first position, as shown in FIG. 3, is of first member 12 in cross-section through aligning hole 14. Member 12 is in a structural channel configuration defined by web 42 and first and second flanges 44, 48 depending or extending from opposite transverse edges 46 of web 42. Second member 16 is in a structural angle configuration whereby first flange 56 is depending from transverse edge 58 of web 52. First flange 56 has notched opening 64 defined by first flange edge surface which in this preferred embodiment is cam surface 40 longitudinally spaced from second flange edge surface 68 extending from bottom edge 60 to web 52. Flange portion 56 extending from edge end surface 62 to cam surface 40 defines seating lug 26.

It should be remembered that in its preferred embodiment, FIGS. 3–6 only show one axial end 24 of second member 16. At opposite axial end 24 the same steps are contemplated. However, in the case where second member 16 is a cantilever, the FIGS. 3–6 are pictorially accurate.

Figure 4:
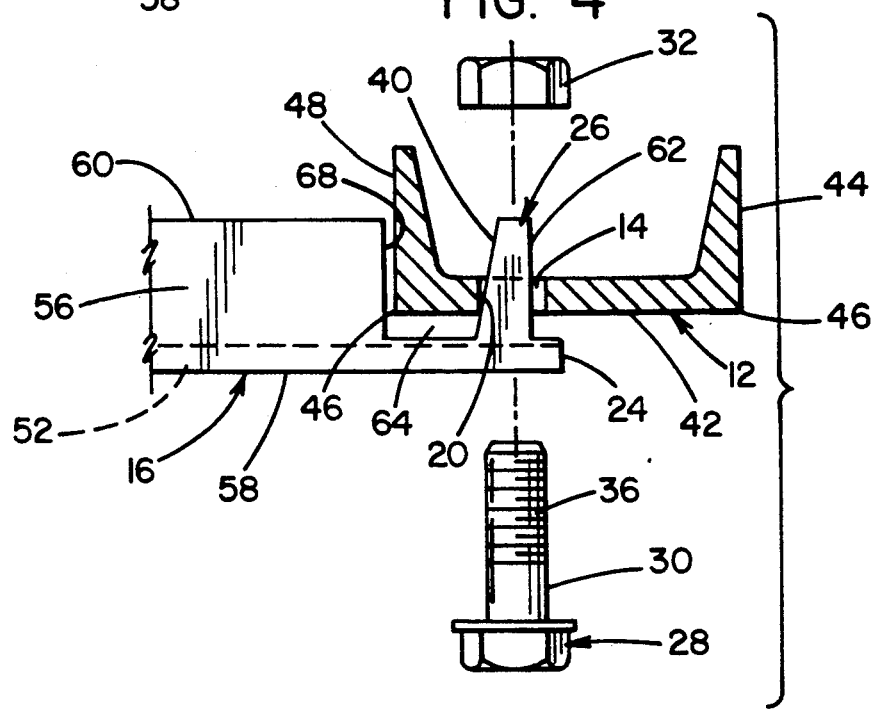
FIG. 4 is a plan view taken in cross-section showing the seating lug after it has been inserted into an aligning hole and showing the step of inserting a fastener through an aligning hole and a fastening hole in registry with one another.

FIG. 4 shows the feature of the invention that allows rack 10 to be safely assembled and disassembled at varying heights above ground elevation. Current assemblies require workmen to hold a second member 16 in place while it is connected. Seating lug 26 of this invention allows workmen to place second member 16 and subsequently place fastener 28 without supporting member 16. They do not have to hold one beam with one hand and try to align that beam with one hand as they insert the fastener into the hole with the other hand. Therefore, workmen can keep their hands free while moving about on rack system 10, reducing the chances of a fall and serious injury.

Seating lug 26 of second member 16 is inserted into aligning hole 14 of first member 12. Tapering cam surface 40 is engaging inside bearing surface 20 of aligning hole 14. When opposite axial end 24 of second member 16 is so configured, member 16 will support its own weight allowing fastener 28 to be inserted. Here, fastener 28 is bolt 30 and nut 32 which is to be inserted through fastener hole 22 and aligning hole 14 which are in registry due to the action of tapering cam surface 40.

Figure 5:
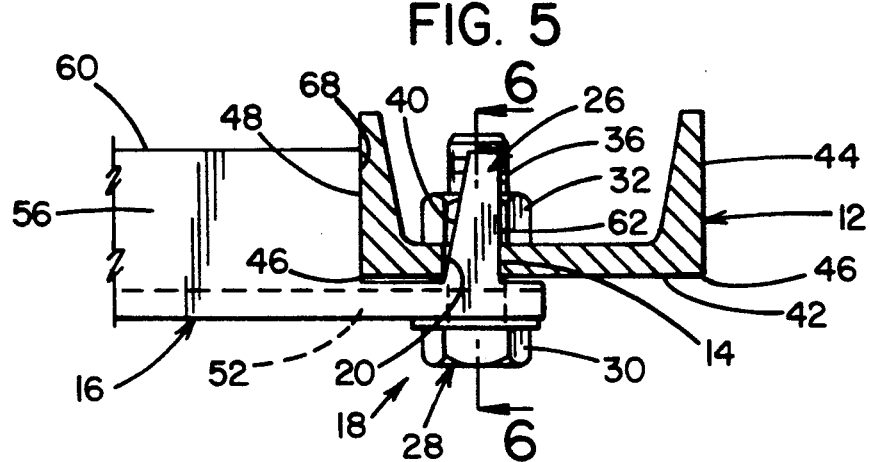
FIG. 5 is a view taken along line 5—5 of FIG. 1 showing the method of tightening the fastener and thereby drawing the first member and the second member into contact.

FIG. 5 shows a completed connection 18 where nut 32 has been threaded onto threaded shank 36 of bolt 30 and tightened thereby drawing first and second members 12 and 16 together. Tapering cam surface 40 on seating lug 26 has so engaged inside bearing surface 20 of aligning hole 14 that second flange edge surface 68 of second member 16 is now in tight contact with second flange 48 of first member 12 and web portion 52 of second member 16 is shown in relatively tight contact with web portion 42 of first member 12. For additional rigidity, seating lug 26 may be welded to first member 12 after connection 18 is complete.

FIG. 6 shows completed connection 18 of FIG. 5 in cross-section where nut 32 has been threaded onto threaded shank 36 of bolt 30 and tightened thereby drawing first and second members 12 and 16 together. Web portion 52 of the second member 16 is shown in relatively tight contact with the web portion 42 of the first member 12.

FIG. 7 shows only one of many alternative embodiments to FIG. 2 where second member 16 has two protruding lugs 26a and 26b. Member 16 has a second flange portion 70 depending from transverse edge 58 of web portion 52 opposite first flange portion 56 to form a structural channel configuration.

First member 12 is joined together with second members 16. First member 12 has plurality of longitudinally spaced aligning holes 14, each hole 14 having inside bearing surface 20. Each second member 16 having fastening hole 22 extending through member 16 adjacent to axial end 24. Seating lugs 26a, 26b of second member 16 are each longitudinally spaced from fastening hole 22 a distance equal to the longitudinal spacing between aligning holes 14 in first member 12. Seating lugs 26a, 26b are adapted to extend into aligning hole 14 in first member 12 which positions another aligning hole 14 in first member 12 in registry with fastening hole 22 in second member 16. Fastener means 28, such as bolt 30 and nut 32 protrude through fastening hole 22 and aligning hole 14 for drawing first member 12 and second member 16 together.

Seating lugs 26a, 26b include cam surfaces 40a and 40b for engaging inside bearing surface 20 of aligning holes 14. Cam surfaces 40a and 40b allow first member 12 and second member 16 to move into side-by-side contact when fastener 28 draws members 12 and 16 together.

First member 12 includes longitudinally extending web portion 42 which has plurality of aligning holes 14 extending therethrough at spaced increments along the length of web 42. First member 12 also includes first flange portion 44 depending from transverse edge 46 of web portion 42 and second flange portion 48 depending from transverse edge 46 of web 42 opposite first flange portion 44 and extending between axial ends 50 of first member 12, thereby forming a structural channel configuration. Cam surfaces 40a, 40b bring second member 16 into contact with first flange portion 44 of first member 12.

Second member 16 includes web portion 52 longitudinally extending between each of axial ends 24 with fastening hole 22 extending through web 52 adjacent to axial ends 24. First and second flanges 56 and 70 have longitudinally spaced edge end surfaces 62 and 72, respectively, each spaced a longitudinal distance away from axial ends 24 of second member 16 at least equal to the diameter of the fastening hole 22. First and second flange portions 56 and 70 also have notched opening 64 extending from bottom edge 60 to web portion 52. Just as single seating lug 26 in the preferred embodiment, seating lugs 26a, 26b displace second member 16 into contact with first member 12, when web portions 42 and 52 are brought into relative contact with one another by fastener 28.

The invention has been described with reference to preferred and alternative embodiments. Obviously, modifications and alterations other than those discussed herein will occur to those skilled in the art upon reading and understanding the invention. It is intend to include all such modifications insofar as they come within the scope of the invention.

Having thus described the invention, it is claimed:

1. A connection for a rack system joining together first and second elongated structural members, said first member having a plurality of longitudinally spaced aligning holes extending therethrough with each aligning hole having inside bearing surface and said second member having at least one fastening hole extending therethrough adjacent its axial ends, said connection comprising:

said second member having at least one seating lug longitudinally spaced from said fastening hole a distance equal to the longitudinal spacing between said aligning holes in said first member, said seating lug adapted to extend within one of said aligning holes in said first member to position another aligning hole in said first member in registry with said fastening hole in said second member;

fastener means protruding through said fastening hole and said other aligning hole for drawing said first and said second members together; and cam means on said seating lug engaging said inside bearing surface of said one aligning hole for moving one of said members into side-by-side contact with the other one of said members when said fastener means draws said first and said second members together.

2. The connection of claim 1, wherein said first member includes a longitudinally extending web portion having a plurality of said aligning holes therethrough at spaced increments along its length and a longitudinally extending first flange portion depending from a transverse edge of said web portion and extending between the axial ends of said first member, said camming means effective to bring said second member into contact with said first flange portion of said first member.

3. The connection of claim 2, wherein said second member includes a web portion longitudinally extending between its axial ends with said fastening hole extending therethrough adjacent each of its axial ends; said second member having a longitudinally extending first flange portion depending from a transverse edge of said web portion and terminating at a bottom edge; said first flange portion having longitudinally spaced edge end surfaces, each longitudinal end surface spaced a longitudinal distance away from the axial ends of said second member; said flange portion further having a notched opening extending from said bottom edge to said web portion to define longitudinally spaced first and second flange edge surfaces extending from said bottom edge to said web portion, said seating lug including that segment of said flange portion longitudinally extending from said longitudinal end surface to said first edge surface.

4. The connection of claim 3, wherein at least one of said end surface and said first edge surface tapers so that the longitudinal distance of said seating lug is greater at said web portion than at said bottom edge whereby said seating lug displaces said second member into contact with said first member when said web portion of said first and second members are brought into contact with one another by said fastener means.

5. The connection of claim 4, wherein said second edge surface is generally orthogonal to said web portion whereby said second edge surface contacts said flange portion of said first member when said web portions of one member contacts the web portion of another member to make a rigid connection.

6. The connection of claim 1, wherein said second member has two fastening holes longitudinally spaced from said seating lug, said fastening holes and seating lug spaced at distances equal to the longitudinal spacing between said aligning holes in said first member.

7. The connection of claim 2, wherein said first member has a second flange portion depending from a transverse edge of said web portion opposite said first flange portion to form a structural channel configuration.

8. The connection of claim 3, wherein said second member has a second flange portion depending from a transverse edge of said web portion opposite said first flange portion to form a structural channel configuration.

9. A rack apparatus comprising:
a) a plurality of first elongated structural members, each first member having a plurality of longitudinally spaced aligning holes extending therethrough having an inside bearing surface;
b) a plurality of second elongated structural members connected to said plurality of said first elongated structural members, each second member connected to a first member, each second member having at least one seating lug protruding from at least one axial end thereof and at least one fastening hole longitudinally spaced from said seating lug at said axial end, said seating lug of one of said second members adapted to be inserted into one of said aligning holes in one of said first members whereby said fastening hole in said second member is brought into registry with an aligning hole in said first member;
c) fastener means protruding through said fastening hole and said aligning holes for drawing said members together; and
d) cam means on said seating lug of said second elongated structural member in sliding contact with said inside bearing surface of said aligning hole for moving one of said first and second members into general orthogonal contact with the other member when said fastening means draw said first and second member together whereby a rigid assembly is assured.

10. The rack of claim 9, wherein said first member includes a longitudinally extending web portion having a plurality of said aligning holes therethrough at spaced increments along its length and a longitudinally extending first flange portion depending from a transverse edge of said web portion and extending between the axial ends of said first member, said camming means effective to bring said second member into contact with said first flange portion of said first member.

11. The rack of claim 10, said second member includes a web portion longitudinally extending between its axial ends with said fastening hole extending therethrough adjacent each of its axial ends; said second member having a longitudinally extending first flange portion depending from a transverse edge of said web portion and terminating at a bottom edge; said first flange portion having longitudinally spaced edge end surfaces, each longitudinal end surface spaced a longitudinal distance away from the axial ends of said second member; said flange portion further having a notched opening extending from said bottom edge to said web portion to define longitudinally spaced first and second flange edge surfaces extending from said bottom edge to said web portion, said seating lug including that segment of said flange portion longitudinally extending from said longitudinal end surface to said first surface.

12. The rack of claim 11, wherein at least one of said end surface and said first edge surface tapers so that the longitudinal distance of said seating lug is greater at said web portion than at said bottom edge whereby said seating lug displaces said second member into contact with said first member when said web portion of said first and second members are brought into contact with one another by said fastener means.

13. The rack of claim 12, wherein said second edge surface is generally orthogonal to said web portion whereby said second edge surface contacts said flange portion of said first member and said web portions of one member contacts the web portion of another member to make a rigid connection.

14. The rack of claim 9, said second member has two fastening holes longitudinally spaced from said seating lug, said fastening holes and said seating lug spaced at distances equal to the longitudinal spacing between said aligning holes in said first member.

15. The rack of claim 10, wherein said first member has a second flange portion depending from a transverse edge of said web portion opposite said first flange portion to form a structural channel configuration.

16. The rack of claim 11, wherein said second member has a second flange portion depending from a transverse edge of said web portion opposite said flange portion to form a structural channel configuration.

17. The rack of claim 9, wherein said fastener means include a bolt and a nut, said bolt having a bolt head and a threaded shank defining a longitudinal axis, said nut having a threaded hole to engage said threaded shank of said bolt.

18. The rack of claim 9, wherein two of said second members are connected to one of said first members, said one of said first members having a first plurality of aligning holes at equally spaced distances generally centered on a first longitudinally extending axis in a first row, and a second plurality of aligning holes at equally spaced distances generally centered on a second longitudinally extending axis in a second row, said seating lug in one of said second members inserted into an aligning hole in said first row and said seating lug of said other second member in one of said aligning holes in said second row.

19. The rack of claim 9, wherein said second member has two seating lugs longitudinally spaced on either side of said fastening hole; said seating lugs and said fastening hole spaced at distances equal to the longitudinal spacing between said aligning holes in said first member.

20. A system for removably assembling structural members to one another comprising:
a) a plurality of first elongated structural members, each first member having a plurality of longitudinally spaced aligning holes extending therethrough with each aligning hole having an inside bearing surface;
b) a plurality of second elongated structural members removably connected to said first elongated structural members, each second member having at least one seating lug protruding from at least one axial end thereof and at least one fastening hole longitudinally spaced from said seating lug at said axial end, said seating lug of one of said second members adapted to be inserted into one of said aligning holes in one of said first members whereby said fastening hole in said second member is brought into registry with another one of said aligning holes in said first member;
c) removable fastener means protruding through said fastening hole and said another aligning hole for drawing said members together; and
d) cam means on said seating lug for moving one of said first and second members into side-by-side contact with the other member when said fastening means draws said first and second member together whereby a rigid assembly is assured.

21. The rack of claim 20, wherein said first member includes a longitudinally extending web portion having a plurality of said aligning holes therethrough at spaced increments along its length and a longitudinally extending first flange portion depending from a transverse edge of said web portion and extending between the axial ends of said first member, said camming means effective to bring said second member into contact with said first flange portion of said first member.

22. The rack of claim 21, wherein said second member includes a web portion longitudinally extending between its axial ends with said fastening hole extending therethrough adjacent each of its axial ends; said second member having a longitudinally extending first flange portion depending from a transverse edge of said web portion and terminating at a bottom edge; said first flange portion having longitudinally spaced edge end surfaces, each longitudinal end surface spaced a longitudinal distance away from the axial ends of said second member; said flange portion further having a notched opening extending from said bottom edge to said web portion to define longitudinally spaced first and second flange edge surfaces extending from said bottom edge to said web portion, said seating lug including that segment of said flange portion longitudinally extending from said longitudinal end surface to said first surface.

23. The rack of claim 22, wherein at least one of said end surface and said first edge surface tapers so that the longitudinal distance of said seating lug is greater at said web portion than at said bottom edge whereby said seating lug displaces said second member into contact with said first member when said web portion of said first and second members are brought into contact with one another by said fastener means.

24. The rack of claim 23, wherein said second edge surface is generally orthogonal to said web portion whereby said second edge surface contacts said flange portion of said first member and said web portions of one member contacts the web portion of another member to make a rigid connection.

25. The rack of claim 20, wherein said second member has two fastening holes longitudinally spaced from said seating lug, said fastening holes and seating lug spaced at distances equal to the longitudinal spacing between said aligning holes in said first member.

26. The rack of claim 21, wherein said first member has a second flange portion depending from a transverse edge of said web portion opposite said first flange portion to form a structural channel configuration.

27. The rack of claim 22, wherein said second member has a second flange portion depending from a transverse edge of said web portion opposite said flange portion to form a structural channel configuration.

28. The rack of claim 20, wherein said fastener means include a bolt and a nut, said bolt having a bolt head and a threaded shank defining a longitudinal axis, said nut having a threaded hole to engage said threaded shank of said bolt 29. The rack of claim 20, wherein two of said second members are connected to one of said first members, said one of said first members having a first plurality of aligning holes at equally spaced distances generally centered on a first longitudinally extending axis in a first row, and a second plurality of aligning holes at equally spaced distances generally centered on a second longitudinally extending axis in a second row, said seating lug in one of said second members inserted into an aligning hole in said first row and said seating lug of said other second member in one of said aligning holes in said second row.

30. The rack of claim 20, wherein said second member has two seating lugs longitudinally spaced on either side of said fastening hole; said seating lugs and said fastening hole spaced at distances equal to the longitudinal spacing between said aligning holes in said first member.

31. A method for assembling first and second elongated structural members together in a rack system, each said first members having a plurality of longitudinally spaced aligning holes therethrough, said method comprising the steps of:
 a) providing each of said second members with a protruding seating lug having a tapering cam surface at each axial ends thereof and at least one fastening hole extending therethrough, said fastening hole longitudinally spaced from said seating lug a distance equal to the longitudinal spacing of said aligning hole in said first member;
 b) orientating a plurality of said first elongated structural members in one direction at spaced intervals therebetween;
 c) inserting one of said seating lugs in one of said second members into one of said aligning holes in one of said first members and then inserting said seating lug at the opposite axis end of said one of said second members into an aligning hole of another one of said first members so that said second member transversely extends between said one first member and said other first member, said seating lugs supporting the weight of said second member and aligning said fastening hole at each end of said second member with an aligning hole in said one of said first member and an aligning hole in said other one of said first member;
 d) providing fasteners;
 e) inserting a fastener through aligned fastening hole and aligning hole and tightening said fastener thereby camming said first and second members together by said tapering cam surface.

32. The method of claim 31, wherein one of said second members has two protruding seating lugs at each of its axis ends.

33. The method of claim 31, wherein said second member has two fastening holes longitudinally spaced from said seating lug at distances equal to the longitudinal spacing between said aligning holes in said first member, and inserting said fasteners through said fastening and aligning holes and tightening same.

* * * * *